(12) United States Patent
Ma et al.

(10) Patent No.: US 11,507,038 B2
(45) Date of Patent: Nov. 22, 2022

(54) QUALITY CONTROL METHOD AND COMPUTING DEVICE UTILIZING METHOD

(71) Applicant: Fulian Precision Electronics (Tianjin) Co., LTD., Tianjin (CN)

(72) Inventors: Kuang-Hui Ma, New Taipei (TW); Shang-Yi Lin, New Taipei (TW); Li-Ming Chen, Neihu (TW)

(73) Assignee: Fulian Precision Electronics (Tianjin) Co., LTD., Tianjin (CN)

( * ) Notice: Subject to any disclaimer, the term of this patent is extended or adjusted under 35 U.S.C. 154(b) by 0 days.

(21) Appl. No.: 17/329,912

(22) Filed: May 25, 2021

(65) Prior Publication Data

US 2021/0373512 A1 Dec. 2, 2021

(30) Foreign Application Priority Data

May 27, 2020 (CN) .......................... 202010463864.2

(51) Int. Cl.
*G05B 13/04* (2006.01)
*G05B 13/02* (2006.01)

(52) U.S. Cl.
CPC ......... *G05B 13/042* (2013.01); *G05B 13/029* (2013.01); *G05B 13/048* (2013.01)

(58) Field of Classification Search
CPC .. G05B 13/042; G05B 13/029; G05B 13/048; G05B 13/0265; G05B 2219/32194; G05B 19/41875; G06Q 10/06395; G06Q 10/04; G06Q 50/04
See application file for complete search history.

(56) References Cited

U.S. PATENT DOCUMENTS

| | | | | |
|---|---|---|---|---|
| 2016/0313651 | A1* | 10/2016 | Middlebrooks | ........ G06N 20/00 |
| 2019/0369503 | A1* | 12/2019 | Ypma | ............... G05B 19/41875 |
| 2020/0272136 | A1* | 8/2020 | Fujita | ............... G05B 19/41875 |
| 2020/0409345 | A1* | 12/2020 | Kagalwala | ....... G05B 19/41875 |
| 2022/0092435 | A1* | 3/2022 | Hasegawa | ............ G06N 3/0454 |

FOREIGN PATENT DOCUMENTS

TW 202013314 A 4/2020

* cited by examiner

*Primary Examiner* — Christopher E. Everett
(74) *Attorney, Agent, or Firm* — ScienBiziP, P.C.

(57) ABSTRACT

In a quality control method applied in manufacturing, product information of a product is obtained. Manufacturing parameters corresponding to the product information are queried. The manufacturing parameters are input into a product quality prediction model which is trained to obtain the value of at least one quality inspection of each product. If such quality inspection value is not equal to a standard value or is not within a standard value range, an incorrect manufacturing parameter is identified from all the manufacturing parameters applicable to each product, the incorrect manufacturing parameter being output when identified.

17 Claims, 3 Drawing Sheets

QUALITY CONTROL METHOD AND COMPUTING DEVICE UTILIZING METHOD

FIELD

The subject matter herein generally relates to manufacturing of electronic products, specifically a quality control method, a quality control system, a computing device, and a computer storage medium.

BACKGROUND

Stringent requirements are applied to the manufacturing of electronic products such as panel displays, printed circuit boards, and semiconductor chips. In order to obtain information as to product quality for control purposes, it is necessary to carry out quality inspections on products produced by machines. There may be multiple manufacturing procedures in production of a product. If any one of the manufacturing procedures has a problem, the product may be defective. Although full quality control can be carried out, if the product is inspected in each manufacturing procedure, it will cost a lot of time. In high-precision manufacturing, an inspection of a single product can take several hours. In order to reduce inspection time, random checks are usually adopted, but these cannot avoid all possible problems in manufacturing.

DETAILED DESCRIPTION

For clarity, of illustration of objectives, features and advantages of the present disclosure, the drawings combined with the detailed description illustrate the embodiments of the present disclosure hereinafter. It is noted that embodiments of the present disclosure and features of the embodiments can be combined, when there is no conflict.

Various details are described in the following descriptions for a better understanding of the present disclosure, however, the present disclosure may also be implemented in ways other than those described herein. The scope of the present disclosure is not to be limited by the specific embodiments disclosed below.

Unless defined otherwise, all technical and scientific terms used herein have the same meaning as commonly understood by one of ordinary skill in the art to which the present disclosure belongs. The terms used herein in the present disclosure are only for the purpose of describing specific embodiments, and are not intended to limit the present disclosure.

Embodiment 1

Figure 1:
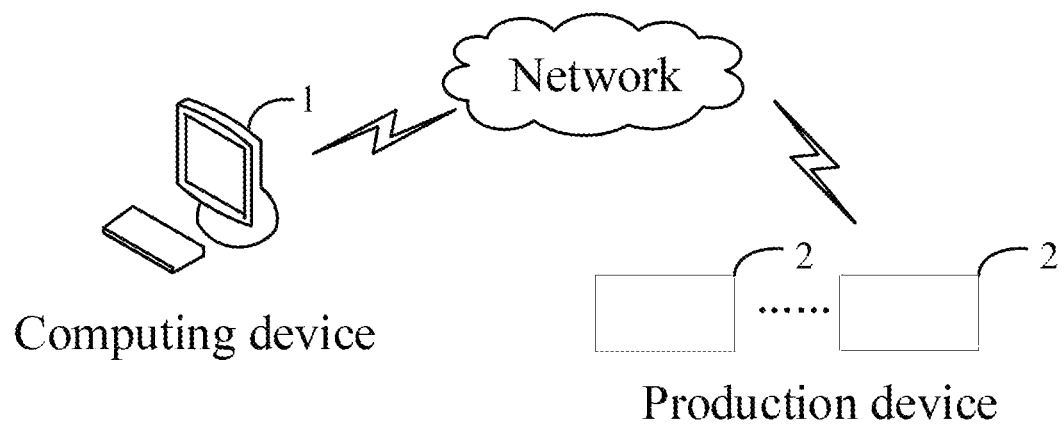
FIG. 1 is a block diagram of an application environment of a quality control method provided in one embodiment of the present disclosure.

FIG. 1 is a block diagram of an application environment of a quality control method provided in one embodiment of the present disclosure.

The quality control method is applied to a computing device 1. The computing device 1 establishes a communication connection to one or more production devices 2 through a network. The network may be a wired network or a wireless network, such as radio, WI-FI, cellular, satellite, broadcasting, etc.

Each production device 2 can obtain manufacturing parameters of a product during a production process of a product. The manufacturing parameters may include, but are not limited to, a process parameter and a performance parameter of each production device 2. There may be multiple production devices 2 connected to the computing device 1. The multiple production devices 2 can be arranged in different workshops and different production procedures. The computing device 1 may obtain the manufacturing parameters from the multiple production devices 2. The production device 2 can be a machine dedicated to one product.

The computing device 1 can obtain product information of a product, and query manufacturing parameters corresponding to the product information. The computing device 1 can input the manufacturing parameters into a product quality prediction model to obtain a value of each quality inspection (hereinafter referred to as "quality inspection value") of the product. The computing device 1 can determine whether such quality inspection value is equal to a standard value or is within a standard value range. If the quality inspection value is not equal to the standard value or is not within the standard value range, the computing device 1 may determine that at least one of the manufacturing parameters is incorrect, and identify and output the incorrect manufacturing parameter. It is the incorrect manufacturing parameter which leads to the quality inspection value not being equal to the standard value or not being within the standard value range. The computing device 1 may be an electronic device installed with quality control software, such as a personal computer, a server, etc. Such a server may be connected to a or the network, the server may be a single server, a server cluster, or a cloud server.

Figure 2:
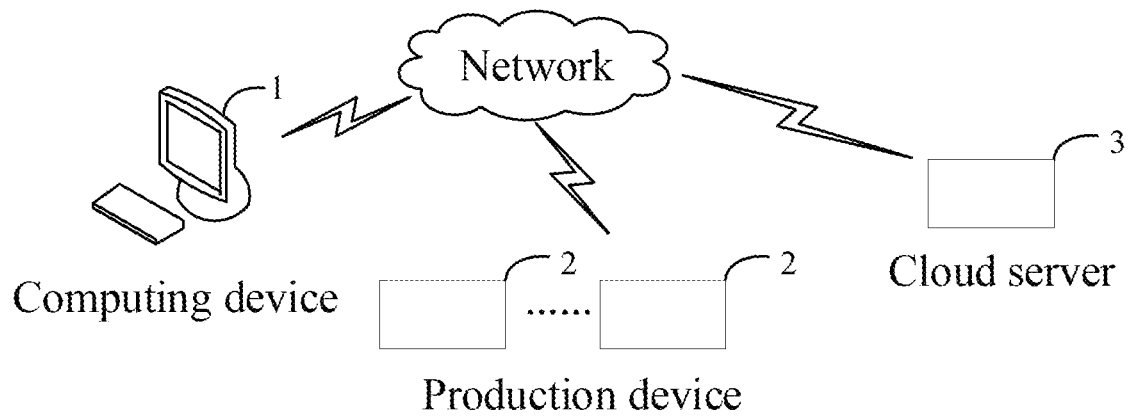
FIG. 2 is a block diagram of an application environment of the quality control method provided in another embodiment of the present disclosure.

In another embodiment of the present disclosure, as shown in FIG. 2, the computing device 1, the at least one production device 2, and a cloud server 3 are connected via a network. The production device 2 may upload the manufacturing parameters (i.e., the process parameter, and the performance parameter of the production device 2) to the cloud server 3. The computing device 1 may acquire the manufacturing parameters from the cloud server 3 according to preset query conditions. For example, the computing device 1 may query the performance parameters of the production device 2.

Embodiment 2

Figure 3:
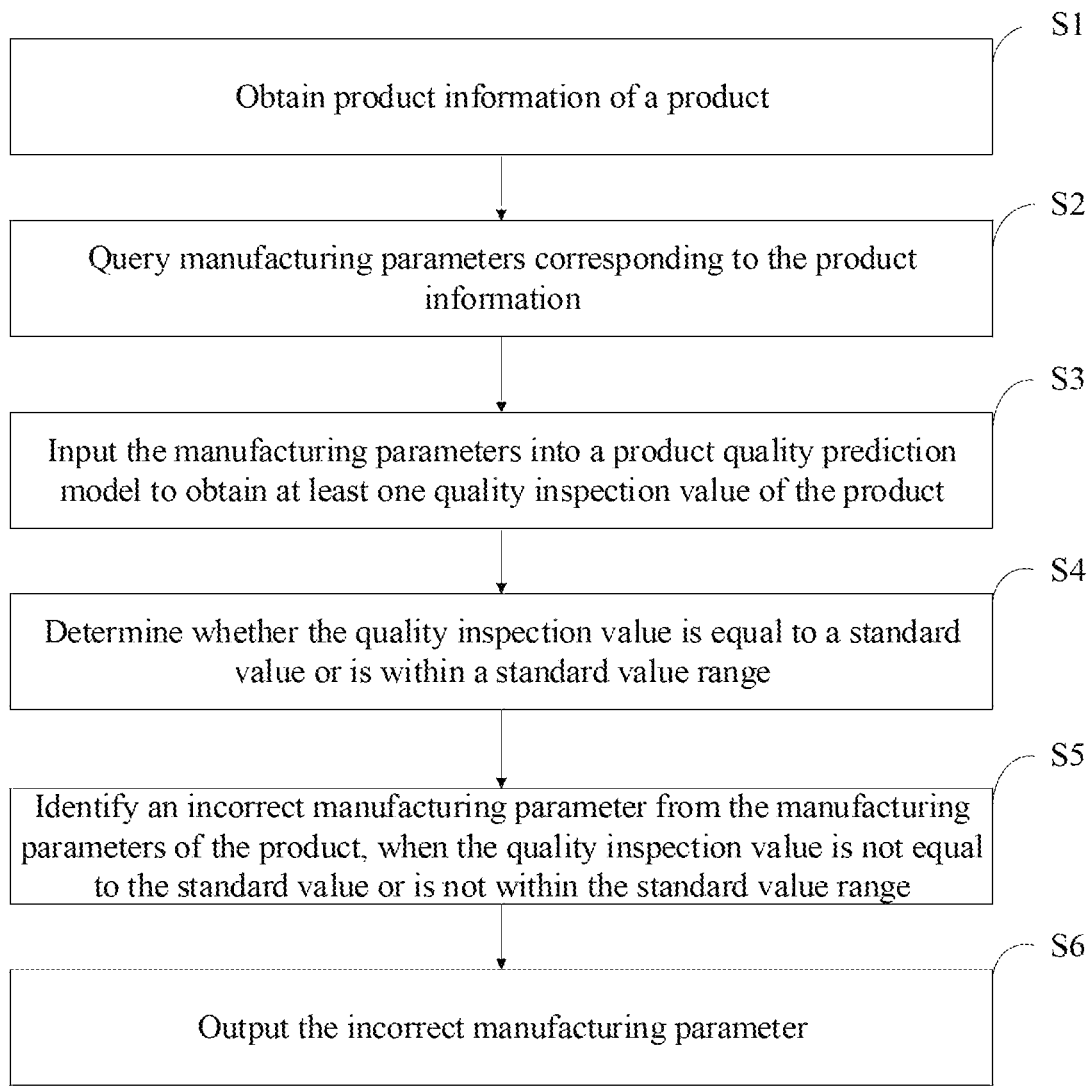
FIG. 3 is a flowchart of a quality control method provided in one embodiment of the present disclosure.

FIG. 3 is a flowchart of a quality control method provided in one embodiment of the present disclosure. According to different requirements, the order of the steps in the flowchart may be changed, and some steps may be omitted. The quality control method may be executed by a computing device.

In block S1, product information of a product is obtained.

In one embodiment, the product information may include a product name, a product model, a material number, a material type, and the like. A method of obtaining the product information of the product may include: receiving a product model input by a user; or obtaining images of materials placed in a production device 2 of the product in real time, using an image recognition method to identify objects in the images to obtain a material name, and obtain the product information of the product according to the material name.

In block S2, manufacturing parameters corresponding to the product information are queried.

The manufacturing parameters may include a process parameter and a performance parameter of the production device relevant to the product.

A method of querying the manufacturing parameters corresponding to the product information may include: obtaining the manufacturing parameters of the production device 2 in real time; or querying a look-up table that describes a relationship between product information and manufacturing parameters to obtain the manufacturing parameters corresponding to the product. The look-up table records manufacturing parameters of at least one production device 2.

In block S3, the manufacturing parameters are input into a product quality prediction model to obtain at least one quality inspection value of the product.

The quality inspection value of the product is established as a prediction by the product quality prediction model. The manufacturing parameters are input into the product quality prediction model. The product quality prediction model uses a predictive algorithm to obtain quality inspection value according to the manufacturing parameters. The predictive algorithm can be a deep learning algorithm or a machine learning algorithm.

A method for training the product quality prediction model is provided. The product quality prediction model can be a deep learning model based on a convolutional neural network.

Sample data of the product quality prediction model are obtained and divided into a training set and a validation set. The sample data include quality inspection values and manufacturing parameters of sample products.

The training set is used to adjust parameters of the product quality prediction model.

The validation set is used to verify the product quality prediction model, and an accuracy of the product quality prediction model is calculated.

A determination is made as to whether the accuracy of the product quality prediction model is more or less than a preset threshold.

If the accuracy of the product quality prediction model is not less than the preset threshold, the training of the product quality prediction model ends.

If the accuracy of the product quality prediction model is less than the preset threshold, the training set is re-used to adjust parameters of the product quality prediction model, and the validation set is re-used to verify the product quality prediction model, until the accuracy of the product quality prediction model is not less than the preset threshold.

The parameters of the product quality prediction model may include an amount of convolution kernels of the product quality prediction model, an amount of elements in pooling layers of the product quality prediction model, an amount of elements in fully connected layers of the product quality prediction model, and a relationship between different layers of the product quality prediction model.

In other embodiments, the product quality prediction model may also be a deep learning model based on a Naive Bayes algorithm, a multi-class support vector machine algorithm, a logistic regression classification algorithm, or a decision tree classification algorithm.

In practice, the product quality prediction model can be periodically retrained according to a life cycle of the product. For example, when an environment of the production device 2 changes, when the production device 2 is repaired and maintained, or when operations of the user change, the product quality prediction model can be retrained. A frequency of retraining the product quality prediction model can be set according to actual production requirements. For example, in a pilot run phase of the product, the parameters of the product quality prediction model can be adjusted once a day. In a mass production phase of the product, the parameters of the product quality prediction model can be adjusted once a month.

In block S4, a determination is made as to whether the quality inspection value is equal to a standard value or is within a standard value range.

If the quality inspection value is equal to the standard value or is within the standard value range, the quality inspection value of the product is deemed normal. If the quality inspection value is not equal to the standard value or is not within the standard value range, the quality inspection value of the product is deemed abnormal.

In block S5, if the quality inspection value is not equal to the standard value or is not within the standard value range, an incorrect manufacturing parameter is identified from the manufacturing parameters of the product.

In one embodiment, a method of identifying an incorrect manufacturing parameter may include: determining a reference value of each manufacturing parameter according to the training set of the product quality prediction model. Reference values of all the manufacturing parameters constitute a reference value vector. In one embodiment, a method of determining the reference value of each manufacturing parameter may include: determining a range of a manufacturing parameter according to the training set of the product quality prediction model; and determining a central value within such range as the reference value of the manufacturing parameter. For example, a temperature of the product is between 100° C. and 150° C. during a particular process, and a central temperature of 125° C. is determined as the reference value of the processing temperature.

In another embodiment, the reference value of the manufacturing parameter can be set according to requirements. For example, when the manufacturing parameter is an explicit value, a smoothness of surfaces of the sample products is desirable. The reference value of the relevant manufacturing parameter can be set as the explicit value.

In still another embodiment, a method of determining the reference value of each manufacturing parameter may include: determining a range of the manufacturing parameter according to the training set of the product quality prediction model; and determining a mean value according to the range of the manufacturing parameter as the reference value of the manufacturing parameter.

The reference value vector is input into the product quality prediction model to obtain a reference value of each quality inspection (hereinafter referred to as "reference quality inspection value").

A new vector is obtained each time one reference value of the reference value vector is replaced by a corresponding manufacturing parameter of the product. The number of all new vectors is equal to the number of the manufacturing parameters applicable to the product.

Each new vector is input into the product quality preset model to obtain a new quality inspection value.

Each new quality inspection value is compared with the reference quality inspection value, and a new quality inspection value with a largest deviation from the reference quality inspection value is determined.

A manufacturing parameter of the product corresponding to the new quality inspection value with the largest deviation from the reference quality inspection value is determined to be an incorrect manufacturing parameter.

A method of comparing each new quality inspection value with the reference quality inspection value, and determining a new quality inspection value with a largest deviation may include: calculating a difference between each new quality inspection value and the reference quality inspection value, and determining a new quality inspection value with a largest difference as the new quality inspection value with the largest deviation; or calculating a standard deviation between each new quality inspection value and the reference quality inspection value, and determining a new quality inspection value with a largest standard deviation as the new quality inspection value with the largest deviation.

For example, each product includes P (P is a natural number) manufacturing parameters, the P manufacturing parameters are input to the product quality prediction model for quality prediction. Manufacturing parameters of a T-th (T is a natural number) product can be defined as $\{X_{1T}, X_{2T}, \ldots, X_{PT}\}$. If a quality inspection value of the T-th product (defined as $Y^1$) obtained by the product quality preset model is not equal to the standard value or is not within the standard value range, there must be at least one incorrect parameter in the manufacturing parameters $\{X_{1T}, X_{2T}, \ldots, X_{PT}\}$. To determine such an incorrect parameter, a reference value vector $\{S_{1T}, S_{2T}, \ldots, S_{PT}\}$ is determined according to the training set of the product quality prediction model. The reference value vector $\{S_{1T}, S_{2T}, \ldots, S_{PT}\}$ is input into the product quality prediction model to obtain a reference quality inspection value $Y^2$. Each time one reference value of the reference value vector $\{S_{1T}, S_{2T}, \ldots, S_{PT}\}$ is replaced by a corresponding manufacturing parameter (i.e., $X_{1T}, X_{2T}, \ldots,$ or $X_{PT}$) of the product, to obtain a new vector (denoted as $\{X_{1T}, S_{2T}, \ldots, S_{PT}\}, \{S_{1T}, X_{2T}, \ldots, S_{PT}\}, \ldots, \{S_{1T}, S_{2T}, \ldots, X_{PT}\}$). The number of all new vectors is P. Each new vector is input into the product quality prediction model to obtain a new quality inspection value (denoted as $Y_{1T}, Y_{2T}, \ldots, Y_{PT}$). Each of the new quality inspection values $Y_{1T}, Y_{2T}, \ldots, Y_{PT}$ is compared with the reference quality inspection value $Y^2$, and a new quality inspection value with the largest deviation from the reference quality inspection value $Y^2$ is determined. For example, if a difference between $Y_{2T}$ and $Y^2$ is the largest difference, the manufacturing parameter $X_{2T}$ is determined as the incorrect manufacturing parameter. That is, application of the manufacturing parameter $X_{2T}$ may cause the quality inspection value Y of the product to be abnormal.

In block S6, the incorrect manufacturing parameter is output.

The incorrect manufacturing parameter may be output to relevant users via emails, voice messages, or lights.

In one embodiment, the computing device may be further connected to an inspection device, and the quality control method may further include: acquiring a quality inspection value from the inspection device, and determining whether an inspection item corresponding to the quality inspection value of the inspection device is consistent with an inspection item corresponding to a standard inspection item.

If the inspection item corresponding to the quality inspection value of the inspection device is inconsistent with the inspection item corresponding to the standard inspection item, a new training set of the product quality prediction model is obtained. The new training set is used to retrain the product quality prediction model.

The retrained product quality prediction model is used to predict the quality inspection value of the product.

In another embodiment, the quality control method may further include: receiving a corrected manufacturing parameter of the incorrect manufacturing parameter; and determining a conformity of the corrected manufacturing parameter to a standard manufacturing parameter. The corrected manufacturing parameter is obtained by correcting the incorrect manufacturing parameter. If a difference between the corrected manufacturing parameter and the standard manufacturing parameter is less than a first value (such as 0.05), the corrected manufacturing parameter is regarded as being in a high conformity, and can be output in a first form. The corrected manufacturing parameter can be output with color prompts or different shapes of graphics, or via a voice message.

If the difference between the corrected manufacturing parameter and the standard manufacturing parameter is less than a second value (such as 0.1), the corrected manufacturing parameter is regarded as being in a middle conformity, and can be output in a second form.

If the difference between the corrected manufacturing parameter and the standard manufacturing parameter is less than a third value (such as 0.5), the corrected manufacturing parameter is regarded as being in a low conformity, and can be output in a third form.

Embodiment 3

Figure 4:
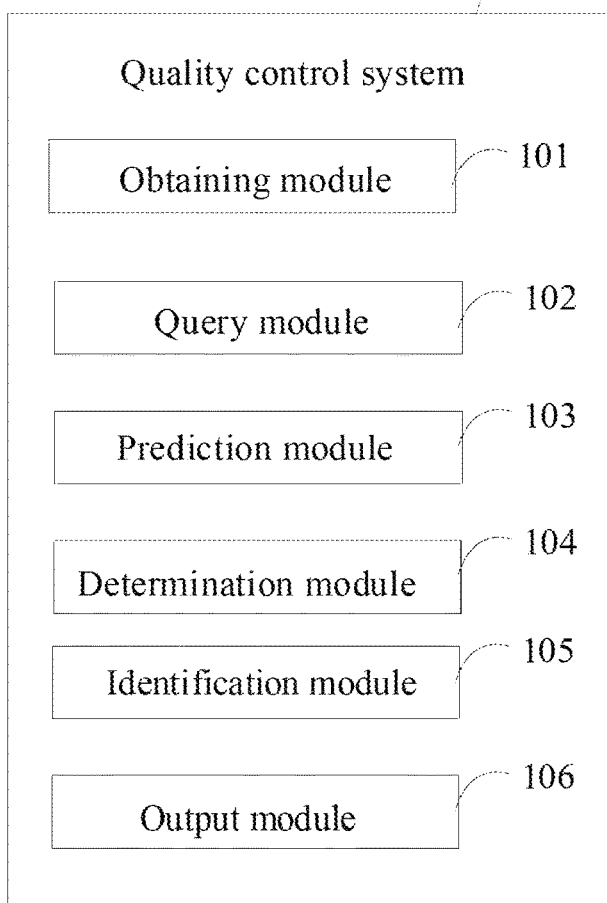
FIG. 4 is a block diagram of a quality control system provided in one embodiment of the present disclosure.

FIG. 4 is a block diagram of a quality control system provided in one embodiment of the present disclosure.

In some embodiments, the quality control system 10 may run in a computing device. The computing device may be connected to a plurality of user terminals through a network. The quality control system 10 may include a plurality of function modules consisting of program code segments. The program code of each program segment in the quality control system 10 may be stored in a storage device and executed by at least one processor to execute part or all of the steps in the quality control system method described in FIG. 1.

In the embodiment, the quality control system 10 may be divided into a plurality of functional modules, according to the performed functions. The functional modules may include: an obtaining module 101, a query module 102, a prediction module 103, a determination module 104, an identification module 105, and an output module 106. A module as referred to in the present disclosure refers to a series of computer-readable instruction segments that can be executed by at least one processor and that are capable of performing fixed functions, which are stored in a storage device.

The obtaining module 101 is configured to obtain product information of a product.

In one embodiment, the product information may include a product name, a product model, a material number, a material type, and the like. A method of obtaining the product information of the product may include: receiving a product model input by a user; or obtaining images of materials placed in a production device 2 of the product in real time, using an image recognition method to identify objects in the images to obtain a material name, and obtain the product information of the product according to the material name.

The query module 102 is configured to query manufacturing parameters corresponding to the product information.

The manufacturing parameters may include a process parameter and a performance parameter of the production device relevant to the product.

A method of querying the manufacturing parameters corresponding to the product information may include: obtaining the manufacturing parameters of the production device 2 in real time; or querying a look-up table that describes a relationship between product information and manufacturing parameters to obtain the manufacturing parameters corresponding to the product. The look-up table records the manufacturing parameters of at least one production device 2.

The prediction module 103 is configured to input the manufacturing parameters into a product quality prediction model to obtain at least one quality inspection value of the product.

The quality inspection value of the product is established as a prediction by the product quality prediction model. The manufacturing parameters are input into the product quality prediction model. The product quality prediction model uses a predictive algorithm to obtain quality inspection value according to the manufacturing parameters. The predictive algorithm can be a deep learning algorithm or a machine learning algorithm.

A method for training the product quality prediction model is provided. The product quality prediction model can be a deep learning model based on a convolutional neural network.

Sample data of the product quality prediction model are obtained and divided into a training set and a validation set. The sample data include quality inspection values and manufacturing parameters of sample products.

The training set is used to adjust the parameters of the product quality prediction model.

The validation set is used to verify the product quality prediction model, and an accuracy of the product quality prediction model is calculated.

A determination is made as to whether the accuracy of the product quality prediction model is more or less than a preset threshold.

If the accuracy of the product quality prediction model is not less than the preset threshold, the training of the product quality prediction model ends.

If the accuracy of the product quality prediction model is less than the preset threshold, the training set is re-used to adjust parameters of the product quality prediction model, and the validation set is re-used to verify the product quality prediction model, until the accuracy of the product quality prediction model is not less than the preset threshold.

The parameters of the product quality prediction model may include an amount of convolution kernels of the product quality prediction model, an amount of elements in pooling layers of the product quality prediction model, an amount of elements in fully connected layers of the product quality prediction model, and a relationship between different layers of the product quality prediction model.

In other embodiments, the product quality prediction model may also be a deep learning model based on a Naive Bayes algorithm, a multi-class support vector machine algorithm, a logistic regression classification algorithm, or a decision tree classification algorithm.

In practice, the product quality prediction model can be periodically retrained according to a life cycle of the product. For example, when an environment of the production device 2 changes, when the production device 2 is repaired and maintained, or when operations of the user change, the product quality prediction model can be retrained. A frequency of retraining the product quality prediction model can be set according to actual production requirements. For example, in a pilot run phase of the product, the parameters of the product quality prediction model can be adjusted once a day. In a mass production phase of the product, the parameters of the product quality prediction model can be adjusted once a month.

The determination module 104 is configured to determine whether the quality inspection value is equal to a standard value or is within a standard value range.

If the quality inspection value is equal to the standard value or is within the standard value range, the quality inspection value of the product is deemed normal. If the quality inspection value is not equal to the standard value or is not within the standard value range, the quality inspection value of the product is deemed abnormal.

The identification module 105 is configured to identify an incorrect manufacturing parameter from the manufacturing parameters of the product, if the quality inspection value is not equal to the standard value or is not within the standard value range.

In one embodiment, a method of identifying an incorrect manufacturing parameter may include: determining a reference value of each manufacturing parameter according to the training set of the product quality prediction model. Reference values of all the manufacturing parameters constitute a reference value vector. In one embodiment, a method of determining a reference value of each manufacturing parameter may include: determining a range of a manufacturing parameter according to the training set of the product quality prediction model; and determining a central value within such range as the reference value of the manufacturing parameter. For example, a temperature of the product is between 100° C. and 150° C. during a particular process, and a central temperature of 125° C. is determined as the reference value of the processing temperature.

In another embodiment, the reference value of the manufacturing parameter can be set according to requirements. For example, when the manufacturing parameter is an explicit value, a smoothness of surfaces of the sample products is desirable. The reference value of the relevant manufacturing parameter can be set as the explicit value.

In still another embodiment, a method of determining the reference value of each manufacturing parameter may include: determining a range of the manufacturing parameter according to the training set of the product quality prediction model; and determining a mean value according to the range of the manufacturing parameter as the reference value of the manufacturing parameter.

The reference value vector is input into the product quality prediction model to obtain a reference value of each quality inspection (hereinafter referred to as "reference quality inspection value").

A new vector is obtained each time one reference value of the reference value vector is replaced by a corresponding manufacturing parameter of the product. The number of all new vectors is equal to the number of the manufacturing parameters applicable to the product.

Each new vector is input into the product quality preset model to obtain a new quality inspection value.

Each new quality inspection value is compared with the reference quality inspection value, and a new quality inspection value with a largest deviation from the reference quality inspection value is determined.

A manufacturing parameter of the product corresponding to the new quality inspection value with the largest deviation from the reference quality inspection value is determined to be an incorrect manufacturing parameter.

A method of comparing each new quality inspection value with the reference quality inspection value, and determining a new quality inspection value with a largest deviation may include: calculating a difference between each new quality inspection value and the reference quality inspection value, and determining a new quality inspection value with a largest difference as the new quality inspection value with the largest deviation; or calculating a standard deviation between each new quality inspection value and the reference quality inspection value, and determining a new quality inspection value with a largest standard deviation as the new quality inspection value with the largest deviation.

For example, each product includes P (P is a natural number) manufacturing parameters, the P manufacturing parameters are input to the product quality prediction model for quality prediction. Manufacturing parameters of a T-th (T is a natural number) product can be defined as $\{X_{1T}, X_{2T}, \ldots, X_{PT}\}$. If a quality inspection value of the T-th product (defined as $Y^1$) obtained by the product quality preset model is not equal to the standard value or is not within the standard value range, there must be at least one incorrect parameter in the manufacturing parameters $\{X_{1T}, X_{2T}, \ldots, X_{PT}\}$. To determine such an incorrect parameter, a reference value vector $\{S_{1T}, S_{2T}, \ldots, S_{PT}\}$ is determined according to the training set of the product quality prediction model. The reference value vector $\{S_{1T}, S_{2T}, \ldots, S_{PT}\}$ is input into the product quality prediction model to obtain a reference quality inspection value $Y^2$. Each time one reference value of the reference value vector $\{S_{1T}, S_{2T}, \ldots, S_{PT}\}$ is replaced by a corresponding manufacturing parameter (i.e., $X_{1T}, X_{2T}, \ldots,$ or $X_{PT}$) of the product, to obtain a new vector (denoted as $\{X_{1T}, S_{2T}, \ldots, S_{PT}\}, \{S_{1T}, X_{2T}, \ldots, S_{PT}\}, \ldots, \{S_{1T}, S_{2T}, \ldots, X_{PT}\}$). The number of all new vectors is P. Each new vector is input into the product quality prediction model to obtain a new quality inspection value (denoted as $Y_{1T}, Y_{2T}, \ldots, Y_{PT}$). Each of the new quality inspection values $Y_{1T}, Y_{2T}, \ldots, Y_{PT}$ is compared with the reference quality inspection value $Y^2$, and a new quality inspection value with the largest deviation from the reference quality inspection value $Y^2$ is determined. For example, if a difference between $Y_{2T}$ and $Y^2$ is the largest difference, the manufacturing parameter $X_{2T}$ is determined as the incorrect manufacturing parameter. That is, application of the manufacturing parameter $X_{2T}$ may cause the quality inspection value $Y^1$ of the product to be abnormal.

The output module 106 is configured to output the incorrect manufacturing parameter.

The incorrect manufacturing parameter may be output to relevant users via emails, voice messages, or lights.

In one embodiment, the computing device may be further connected to an inspection device, and the quality control method may further include: acquiring a quality inspection value from the inspection device, and determining whether an inspection item corresponding to the quality inspection value of the inspection device is consistent with an inspection item corresponding to a standard inspection item.

If the inspection item corresponding to the quality inspection value of the inspection device is inconsistent with the inspection item corresponding to the standard inspection item, a new training set of the product quality prediction model is obtained. The new training set is used to retrain the product quality prediction model.

The retrained product quality prediction model is used to predict the quality inspection value of the product.

In another embodiment, the quality control method may further include: receiving a corrected manufacturing parameter of the incorrect manufacturing parameter; and determining a conformity of the corrected manufacturing parameter to a standard manufacturing parameter. The corrected manufacturing parameter is obtained by correcting the incorrect manufacturing parameter. If a difference between the corrected manufacturing parameter and the standard manufacturing parameter is less than a first value (such as 0.05), the corrected manufacturing parameter is regarded as being in a high conformity, and can be output in a first form. The corrected manufacturing parameter can be output with color prompts or different shapes of graphics, or via a voice message.

If the difference between the corrected manufacturing parameter and the standard manufacturing parameter is less than a second value (such as 0.1), the corrected manufacturing parameter is regarded as being in a middle conformity, and can be output in a second form.

If the difference between the corrected manufacturing parameter and the standard manufacturing parameter is less than a third value (such as 0.5), the corrected manufacturing parameter is regarded as being in a low conformity, and can be output in a third form.

Embodiment 4

Figure 5:
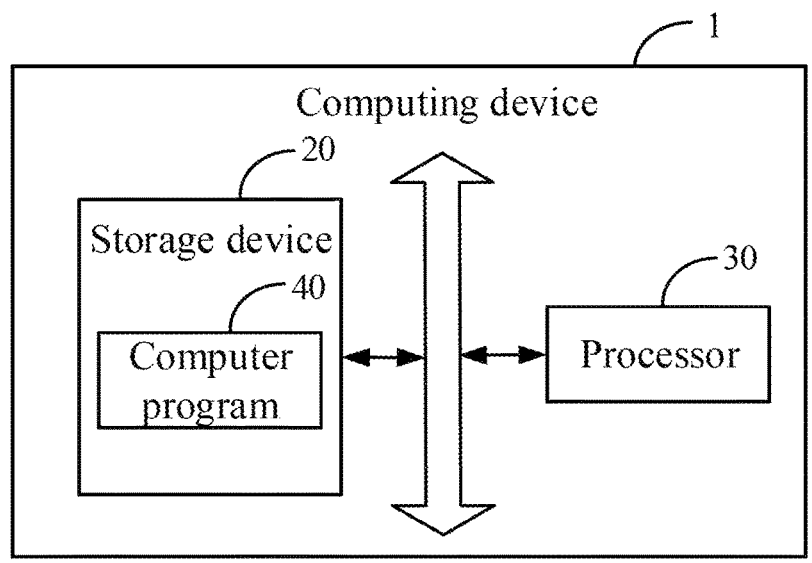
FIG. 5 is a block diagram of a computing device implementing the quality control method in one embodiment of the present disclosure.

FIG. 5 is a block diagram of a computing device implementing the quality control method in one embodiment of the present disclosure.

The computing device 1 may include a storage device 20, at least one processor 30, and a computer program 40 that is stored in the storage device 20 and run on the at least one processor 30. The processor 30 may execute the computer program 40 to implement the steps in the quality control method described above, such as S1 to S6 in FIG. 3. Alternatively, the processor 30 may execute the computer program 40 to implement the functions of the quality control system described above, such as the modules 101-106 in FIG. 4.

In an exemplary embodiment, the computer program 40 may be divided into one or more modules/units, and the one or more modules/units are stored in the storage device 20 and executed by the processor 30 to complete the authority management method of the present disclosure. The one or more modules/units can be a series of computer-readable instruction segments capable of performing specific functions, and the instruction segments are used to describe execution processes of the computer program 40 in the computing device 1. In one example, the computer program 40 may be divided into the obtaining module 101, the query module 102, the prediction module 103, the determination module 104, the identification module 105, and the output module 106.

The computing device 1 may be a desktop computer, a notebook, a palmtop computer, or a cloud server. Those skilled in the art will understand that the block diagram is only an example of the computing device 1, and does not constitute a limitation on the computing device 1. Other examples of the computing device 1 may include more or fewer components than shown in FIG. 4, or combine some components or have different components. For example, the computing device 1 may further include an input/output device, a network access device, a bus, and the like.

The processor 30 may be a central processing unit (CPU) or other general-purpose processor, a digital signal processor (DSP), an application specific integrated circuit (ASIC), a Field-Programmable Gate Array (FPGA) or other programmable logic device, a discrete gate, or a transistor logic device, or a discrete hardware component, etc. The processor 30 may be a microprocessor or any conventional processor. The processor 30 may be a control center of the computing device 1, and connect various parts of the entire computing device 1 by using various interfaces and lines.

The storage device 20 may be configured to store the computer program 40 and/or modules/units. The processor 30 may run or execute the computer-readable instructions and/or modules/units stored in the storage device 20, and may invoke data stored in the storage device 20 to implement various functions of the computing device 1. The storage device 20 may include a program storage area and a data storage area. The program storage area may store an operating system, an application program required for at least one function (such as a sound playback function, an image playback function), etc. The data storage area may store data (such as audio data, or a phone book) created for using the computing device 1. In addition, the storage device 20 may include a random access memory, and may also include a non-transitory storage medium, such as a hard disk, an internal memory, a plug-in hard disk, a smart media card (SMC), and a secure digital (SD) card, a flash card, at least one disk storage device, a flash memory, or other non-transitory solid-state storage device.

When the modules/units integrated in the computing device 1 are implemented in the form of software functional units and used as independent units, they can be stored in a non-transitory readable storage medium. Based on this understanding, all or part of the processes in the methods of the above embodiments implemented by the present disclosure can also be completed by related hardware instructed by computer-readable instructions. The computer-readable instructions may be stored in a non-transitory readable storage medium. The computer-readable instructions, when executed by the processor, may implement the steps of the foregoing method embodiments. The computer-readable instructions include computer-readable instruction codes, and the computer-readable instruction codes can be source code, object code, an executable file, or in some intermediate form. The non-transitory readable storage medium may include any entity or device capable of carrying the computer-readable instruction code, a recording medium, a U disk, a mobile hard disk, a magnetic disk, an optical disk, a computer memory, and a read-only memory (ROM).

In several embodiments provided in the preset application, it should be understood that the disclosed computing device and method may be implemented in other ways. For example, the embodiment of the computing device described above is merely illustrative. For example, the units are only obtained by logical function divisions, and there may be other manners of division in actual implementation.

In addition, each functional unit in each embodiment of the present disclosure can be integrated into one processing unit, or can be physically present separately in each unit, or two or more units can be integrated into one unit. The above integrated unit can be implemented in a form of hardware or in a form of a software functional unit.

The present disclosure is not limited to the details of the above-described exemplary embodiments, and the present disclosure can be embodied in other specific forms without departing from the spirit or essential characteristics of the present disclosure. Therefore, the present embodiments are to be considered as illustrative and not restrictive, and the scope of the present disclosure is defined by the appended claims. All changes and variations in the meaning and scope of equivalent elements are included in the present disclosure. Any reference sign in the claims should not be construed as limiting the claim. Furthermore, the word "comprising" does not exclude other units nor does the singular exclude the plural. A plurality of units or devices stated in the system claims may also be implemented by one unit or device through software or hardware. Words such as "first" and "second" are used to indicate names but do not signify any particular order.

Finally, the above embodiments are only used to illustrate technical solutions of the present disclosure, and are not to be taken as restrictions on the technical solutions. Although the present disclosure has been described in detail with reference to the above embodiments, those skilled in the art should understand that the technical solutions described in one embodiments can be modified, or some of technical features can be equivalently substituted, and that these modifications or substitutions are not to detract from the essence of the technical solutions or from the scope of the technical solutions of the embodiments of the present disclosure.

We claim:

1. A quality control method executed by a computing device, the method comprising:
   obtaining product information of a product;
   querying manufacturing parameters corresponding to the product information;
   inputting the manufacturing parameters into a product quality prediction model to obtain at least one quality inspection value of the product;
   determining whether the quality inspection value is equal to a standard value or is within a standard value range;
   identifying an incorrect manufacturing parameter from the manufacturing parameters of the product, when the quality inspection value is not equal to the standard value or is not within the standard value range, comprising:
      determining a reference value of each manufacturing parameter according to a training set of the product quality prediction model, reference values of all the manufacturing parameters constituting a reference value vector;
      inputting the reference value vector into the product quality prediction model to obtain a reference quality inspection value;
      obtaining a new vector each time one reference value of the reference value vector is replaced by a corresponding manufacturing parameter of the product;
      inputting each new vector into the product quality preset model to obtain a new quality inspection value; and
      comparing each new quality inspection value with the reference quality inspection value, and determining a new quality inspection value with a largest deviation from the reference quality inspection as the incorrect manufacturing parameter; and
   outputting the incorrect manufacturing parameter.

2. The quality control method of claim 1, wherein the product quality prediction model uses a predictive algorithm to obtain the quality inspection value according to the manufacturing parameters, the predictive algorithm being a deep learning algorithm or a machine learning algorithm.

3. The quality control method of claim 1, wherein the computing device is connected to an inspection device, the method further comprising:
acquiring a quality inspection value from the inspection device; and
determining whether an inspection item corresponding to the quality inspection value of the inspection device is consistent with an inspection item corresponding to a standard inspection item.

4. The quality control method of claim 1, determining a reference value of each manufacturing parameter comprising:
determining a range of a manufacturing parameter according to the training set of the product quality prediction model; and
determining a central value within such range as the reference value of the manufacturing parameter.

5. The quality control method of claim 1, comparing each new quality inspection value with the reference quality inspection value, and determining a new quality inspection value with a largest deviation comprising:
calculating a difference between each new quality inspection value and the reference quality inspection value, and determining a new quality inspection value with a largest difference as the new quality inspection value with the largest deviation; or
calculating a standard deviation between each new quality inspection value and the reference quality inspection value, and determining a new quality inspection value with a largest standard deviation as the new quality inspection value with the largest deviation.

6. The quality control method of claim 1, further comprising:
receiving a corrected manufacturing parameter of the incorrect manufacturing parameter;
determining a conformity of the corrected manufacturing parameter to a standard manufacturing parameter;
when a difference between the corrected manufacturing parameter and the standard manufacturing parameter is less than a first value, regarding the corrected manufacturing parameter as being in a high conformity, and outputting the corrected manufacturing parameter in a first form;
when the difference between the corrected manufacturing parameter and the standard manufacturing parameter is less than a second value, regarding the corrected manufacturing parameter as being in a middle conformity, and outputting the corrected manufacturing parameter in a second form;
when the difference between the corrected manufacturing parameter and the standard manufacturing parameter is less than a third value, regarding the corrected manufacturing parameter as being in a low conformity, and outputting the corrected manufacturing parameter in a third form.

7. A computing device, comprising:
at least one processor; and
a storage device storing a plurality of instructions, which when executed by the at least one processor, causes the at least one processor to:
obtain product information of a product;
query manufacturing parameters corresponding to the product information;
input the manufacturing parameters into a product quality prediction model to obtain at least one quality inspection value of the product;
determine whether the quality inspection value is equal to a standard value or is within a standard value range;
identify an incorrect manufacturing parameter from the manufacturing parameters of the product, when the quality inspection value is not equal to the standard value or is not within the standard value range, comprising:
determining a reference value of each manufacturing parameter according to a training set of the product quality prediction model, reference values of all the manufacturing parameters constituting a reference value vector;
inputting the reference value vector into the product quality prediction model to obtain a reference quality inspection value;
obtaining a new vector each time one reference value of the reference value vector is replaced by a corresponding manufacturing parameter of the product;
inputting each new vector into the product quality preset model to obtain a new quality inspection value; and
comparing each new quality inspection value with the reference quality inspection value, and determining a new quality inspection value with a largest deviation from the reference quality inspection as the incorrect manufacturing parameter; and
output the incorrect manufacturing parameter.

8. The computing device of claim 7, wherein the product quality prediction model uses a predictive algorithm to obtain the quality inspection value according to the manufacturing parameters, the predictive algorithm being a deep learning algorithm or a machine learning algorithm.

9. The computing device of claim 7, wherein the computing device is connected to an inspection device, and the at least one processor is further caused to:
acquire a quality inspection value from the inspection device; and
determine whether an inspection item corresponding to the quality inspection value of the inspection device is consistent with an inspection item corresponding to a standard inspection item.

10. The computing device of claim 7, determining a reference value of each manufacturing parameter comprising:
determining a range of a manufacturing parameter according to the training set of the product quality prediction model; and
determining a central value within such range as the reference value of the manufacturing parameter.

11. The computing device of claim 7, comparing each new quality inspection value with the reference quality inspection value, and determining a new quality inspection value with a largest deviation comprising:
calculating a difference between each new quality inspection value and the reference quality inspection value, and determining a new quality inspection value with a largest difference as the new quality inspection value with the largest deviation; or
calculating a standard deviation between each new quality inspection value and the reference quality inspection value, and determining a new quality inspection value with a largest standard deviation as the new quality inspection value with the largest deviation.

12. The computing device of claim 7, wherein the at least one processor is further caused to:
receive a corrected manufacturing parameter of the incorrect manufacturing parameter;

determine a conformity of the corrected manufacturing parameter to a standard manufacturing parameter;

when a difference between the corrected manufacturing parameter and the standard manufacturing parameter is less than a first value, regard the corrected manufacturing parameter as being in a high conformity, and output the corrected manufacturing parameter in a first form;

when the difference between the corrected manufacturing parameter and the standard manufacturing parameter is less than a second value, regard the corrected manufacturing parameter as being in a middle conformity, and output the corrected manufacturing parameter in a second form;

when the difference between the corrected manufacturing parameter and the standard manufacturing parameter is less than a third value, regard the corrected manufacturing parameter as being in a low conformity, and output the corrected manufacturing parameter in a third form.

13. A non-transitory storage medium having stored thereon instructions that, when executed by a computing device, causes the computing device to perform a quality control method, the method comprising:

obtaining product information of a product;

querying manufacturing parameters corresponding to the product information;

inputting the manufacturing parameters into a product quality prediction model to obtain at least one quality inspection value of the product;

determining whether the quality inspection value is equal to a standard value or is within a standard value range;

identifying an incorrect manufacturing parameter from the manufacturing parameters of the product, when the quality inspection value is not equal to the standard value or is not within the standard value range, comprising:

determining a reference value of each manufacturing parameter according to a training set of the product quality prediction model, reference values of all the manufacturing parameters constituting a reference value vector;

inputting the reference value vector into the product quality prediction model to obtain a reference quality inspection value;

obtaining a new vector each time one reference value of the reference value vector is replaced by a corresponding manufacturing parameter of the product;

inputting each new vector into the product quality preset model to obtain a new quality inspection value; and comparing each new quality inspection value with the reference quality inspection value, and determining a new quality inspection value with a largest deviation from the reference quality inspection as the incorrect manufacturing parameter; and outputting the incorrect manufacturing parameter.

14. The non-transitory storage medium of claim 13, wherein the computing device is connected to an inspection device, the method further comprising:

acquiring a quality inspection value from the inspection device; and determining whether an inspection item corresponding to the quality inspection value of the inspection device is consistent with an inspection item corresponding to a standard inspection item.

15. The non-transitory storage medium of claim 13, determining a reference value of each manufacturing parameter comprising:

determining a range of a manufacturing parameter according to the training set of the product quality prediction model; and determining a central value within such range as the reference value of the manufacturing parameter.

16. The non-transitory storage medium of claim 13, comparing each new quality inspection value with the reference quality inspection value, and determining a new quality inspection value with a largest deviation comprising:

calculating a difference between each new quality inspection value and the reference quality inspection value, and determining a new quality inspection value with a largest difference as the new quality inspection value with the largest deviation; or calculating a standard deviation between each new quality inspection value and the reference quality inspection value, and determining a new quality inspection value with a largest standard deviation as the new quality inspection value with the largest deviation.

17. The non-transitory storage medium of claim 13, the method further comprising:

receiving a corrected manufacturing parameter of the incorrect manufacturing parameter;

determining a conformity of the corrected manufacturing parameter to a standard manufacturing parameter;

when a difference between the corrected manufacturing parameter and the standard manufacturing parameter is less than a first value, regarding the corrected manufacturing parameter as being in a high conformity, and outputting the corrected manufacturing parameter in a first form;

when the difference between the corrected manufacturing parameter and the standard manufacturing parameter is less than a second value, regarding the corrected manufacturing parameter as being in a middle conformity, and outputting the corrected manufacturing parameter in a second form;

when the difference between the corrected manufacturing parameter and the standard manufacturing parameter is less than a third value, regarding the corrected manufacturing parameter as being in a low conformity, and outputting the corrected manufacturing parameter in a third form.

* * * * *